United States Patent
Celik et al.

(10) Patent No.: US 10,028,035 B2
(45) Date of Patent: Jul. 17, 2018

(54) METHOD AND SYSTEM FOR WATERMARKING CONTENT PRIOR TO FRAGMENTING

(71) Applicant: CIVOLUTION B.V., Eindhoven (NL)

(72) Inventors: Mehmet Utku Celik, Eindhoven (NL); Martijn Maas, Eindhoven (NL)

(73) Assignee: Civolution B.V., Eindhoven (NL)

( * ) Notice: Subject to any disclaimer, the term of this patent is extended or adjusted under 35 U.S.C. 154(b) by 23 days.

(21) Appl. No.: 14/905,467

(22) PCT Filed: Jul. 21, 2014

(86) PCT No.: PCT/NL2014/050498
§ 371 (c)(1),
(2) Date: Jan. 15, 2016

(87) PCT Pub. No.: WO2015/009159
PCT Pub. Date: Jan. 22, 2015

(65) Prior Publication Data
US 2016/0156994 A1   Jun. 2, 2016

(30) Foreign Application Priority Data
Jul. 19, 2013 (NL) .................................... 2011201

(51) Int. Cl.
| | |
|---|---|
| H04L 29/06 | (2006.01) |
| H04N 21/8358 | (2011.01) |
| H04N 21/845 | (2011.01) |
| H04N 21/2343 | (2011.01) |
| H04N 21/235 | (2011.01) |
| H04N 21/81 | (2011.01) |

(52) U.S. Cl.
CPC ....... *H04N 21/8358* (2013.01); *H04N 21/235* (2013.01); *H04N 21/234345* (2013.01); *H04N 21/8133* (2013.01); *H04N 21/8456* (2013.01)

(58) Field of Classification Search
CPC ....................... H04N 21/8358; H04N 21/8133
See application file for complete search history.

(56) References Cited

U.S. PATENT DOCUMENTS 5,930,369 A * 7/1999 Cox ...................... G06T 1/0028
283/113
5,991,426 A   11/1999 Cox et al.
(Continued)

FOREIGN PATENT DOCUMENTS

| EP | 2204979 A1 | 7/2010 |
|---|---|---|
| GB | 2500447 A | 9/2013 |

(Continued)

*Primary Examiner* — Shawnchoy Rahman
(74) *Attorney, Agent, or Firm* — Casimir Jones, S.C.; Tyler J. Sisk

(57) ABSTRACT

In a method of distributing content in plural fragments, each fragment being no longer than a given maximum fragment length, a method of watermarking the content prior to fragmenting the content into the plural fragments, comprising watermarking a given payload symbol from a given alphabet in a given segment of the content, and treating a segment prior to or following the given segment as an intermediary segment, the length of this intermediary segment being substantially equal to or greater than the maximum fragment length.

10 Claims, 3 Drawing Sheets

(56) References Cited

U.S. PATENT DOCUMENTS

| | | | |
|---|---|---|---|
| 6,185,312 B1 * | 2/2001 | Nakamura | G06T 1/0057 |
| | | | 283/113 |
| 6,895,101 B2 * | 5/2005 | Celik | G06T 1/0028 |
| | | | 382/100 |
| 8,385,590 B1 | 2/2013 | Moorer | |
| 2010/0100742 A1 | 4/2010 | Courington et al. | |

FOREIGN PATENT DOCUMENTS

| | | | | |
|---|---|---|---|---|
| WO | 2010/143026 A1 | 12/2010 | | |
| WO | WO 2013144531 A1 * | 10/2013 | | H04N 21/23439 |

\* cited by examiner

METHOD AND SYSTEM FOR WATERMARKING CONTENT PRIOR TO FRAGMENTING

FIELD OF THE INVENTION

The invention relates to, in a method of distributing content in plural fragments, each fragment being no longer than a given maximum fragment length, a method of watermarking the content prior to fragmenting the content into the plural fragments.

The invention further relates to, in a watermark embedding method, the use of an intermediary segment between two payload segments for the purpose of temporal or spatial alignment in a subsequent detection method.

The invention further relates to a system for executing the method and to a computer program.

BACKGROUND OF THE INVENTION

Watermarking is an effective tool for tracing the source and distribution path of content items, such as movies, pictures, songs, radio and television, which could be made available in streams or downloadable form. One application of watermarking is forensic tracking: when an unauthorized copy of a content item is discovered, an identifier embedded as a watermark may help to determine the origin or path of the unauthorized copy. For example, the name or customer ID of the buyer of a movie can be embedded as a watermark.

When watermarking content is to be distributed, the manner of distribution can be taken into consideration. Some techniques for content distribution operate on the basis of fragments: small portions of a content item, each no longer than a given maximum. Fragment-based distribution fits well with the Internet Protocol, and is often used when a content item is to be distributed for direct viewing ('streaming') instead of as a download. Well-known techniques in the context of internet streaming include Apple HTTP Live Streaming, Microsoft SmoothStreaming and MPEG-DASH. Such techniques may be referred to as adaptive streaming, wherein the content is made available in fragments which are simultaneously encoded at different bit rates. When receiving content, a playback device may for each fragment select the content stream with the maximum bit rate that current network conditions allow. Streaming may be done on 'live' content, i.e. as the content is being generated, or 'non-live', i.e. the delivery of content in a streaming manner from a source having a pre-recorded version of that content.

Each fragment distributed individually, and may take different routes to arrive at a recipient. In fact, different copies of a fragment may be watermarked with different payload information, allowing tracking or identification of each particular copy.

The watermarking of the content however is performed on segments of the content prior to the encoding and fragmenting, each segment being part of a watermarking period. Each segment may be provided with a watermark having a different payload. Furthermore, in combination with adaptive streaming it is not uncommon to watermark the content into more than one streams having a specific symbol as payload to enable distribution to specific destinations or end users.

As watermarking and fragmenting are generally not performed synchronously, i.e. the watermarking periods and fragments are not aligned in time. As a result, after decoding at a receiving device, the fragments may contain segments or parts of segments that have different watermark payloads. This is known as symbol overflow. More precisely, symbol overflow occurs when the watermarking periods in the content during which a single watermark symbol is embedded have a fixed position and a fragment may partially fall into two neighbouring segments having different payload. Detection on fragments of content received may produce suboptimal results. Because of the misalignment watermarked payload data from one fragment may be conflated with payload data from another fragment, resulting in failure to detect either, or in a false symbol detection. So it is impossible to ensure that a fragment only contains watermark symbols from one period.

A known way to cope with the problem of symbol overflow due to varying fragment length is to make the duration of the watermark periods dependent on the fragment lengths instead of fixed. For example, for each symbol embedding a number of fragments is used such that their accumulated duration is at least some pre-determined duration that is required for reliable detection. The downside of this method is that the detector needs to know how the content is divided into fragments to derive the period configuration. Since the fragment durations can generally not be derived from the input stream to the detector, the detector needs side information from the other components in the system. In other words, the detector is informed rather than blind.

Thus, there is a need for a watermarking method that can deal with symbol overflow while not requiring an informed watermark detector.

SUMMARY OF THE INVENTION

The invention provides for a method as claimed in claim 1. The presence of the intermediary segment, with length at least the maximum fragment length, ensures there cannot be any symbol overflow. Preferably, the method comprises providing first copies (or versions) of the first segment and the second segment and providing second copies (or versions) of the first segment and the second segment. The first copies of the first segment and the second segment are watermarked with a first symbol from the given alphabet; and the second copies of the first segment and the second segment are watermarked with a second symbol from the given alphabet. Worded differently, plural copies of the segment are watermarked with respective plural symbols from a common alphabet, for example two copies with 0 and 1 respectively in respective watermarking periods.

In an embodiment a reference watermark is embedded into the intermediary segment, the value of the reference watermark being different from any of the payload symbols in the alphabet. In another embodiment, the method comprises providing a first copy of the intermediary third segment and a second copy of the intermediary third segment; and watermarking the first copy of the intermediary third segment and the second copy of the intermediary third segment with a reference watermark (or embedding the reference watermark in the intermediary third segments). The value of the reference watermark is in this embodiment different from any of the payload symbols in the alphabet.

In a further refinement of this embodiment the payload may be at least partially related to its position in the content. A related problem is that for each period the detector also needs to know the corresponding position in the payload for the embedded symbol. This is not trivial because the detector may miss part of the content, for example the start of the embedding. Obviously, for known embedding arrangement, if the detector knows the position in the payload of a single detected symbol, it can simply derive all the others. With this embodiment, the payload from one fragment now reveals the position.

In an alternative embodiment watermarking is avoided in the intermediary segment. This is the simplest way of achieving the advantage of the invention, and in particular ensures that a false payload in detection is much less likely.

Preferably the method is applied repeatedly to consecutive segments of the content. In such an embodiment, preferably consecutive segments are of equal first length and the plural intermediary segments between the consecutive segments are of an equal, second length.

The invention further provides for a method of detecting a payload symbol from a given alphabet in a portion content of a given length, the payload symbol having been watermarked in a segment of the content, which segment is preceded or followed by an intermediary segment, the length of this intermediary segment being equal to or longer than the maximum possible length of the fragment, comprising, upon detection of the intermediary segment in the portion, initiating a detection of a payload symbol on a further portion of the content starting directly after the end or ending directly before the start of the intermediary segment.

The invention also relates to a system for distributing content in plural fragments, each fragment being no longer than a given maximum fragment length. The system comprises a preprocessor arranged to watermark the content, in which watermarking the content comprises watermarking a given payload symbol from a given alphabet in a first segment of the content and watermarking a given payload symbol from the given alphabet in a second segment of the content; and a divider arranged to divide the content in to a plurality of fragments. The preprocessor is arranged to watermark the content such that the first segment and the second segment are spaced apart by an intermediary third segment, in which the length of this intermediary third segment is substantially equal to or greater than the maximum fragment length.

Furthermore, the invention relates to a detector for detection of a payload symbol from a given alphabet in a portion content of a given length, the payload symbol having been watermarked in a segment of the content, which symbol is preceded or followed by a distinctive intermediary segment, the length of this intermediary segment being substantially equal to or longer than the maximum possible length of the portion, the detector being configured to initiate, upon detection of the intermediary segment in the portion, a detection of a payload symbol on a further portion of the content starting directly after the end or ending directly before the start of the intermediary segment.

The invention further provides for a computer-readable storage medium comprising executable code for causing a computer to operate as the system of the invention.

BRIEF DESCRIPTION OF THE FIGURES

The invention will now be explained in more detail with reference to the figures, in which.

In the figures, same reference numbers indicate same or similar features. In cases where plural identical features, objects or items are shown, reference numerals are provided only for a representative sample so as to not affect clarity of the figures.

DETAILED DESCRIPTION OF CERTAIN EMBODIMENTS

Figure 1:
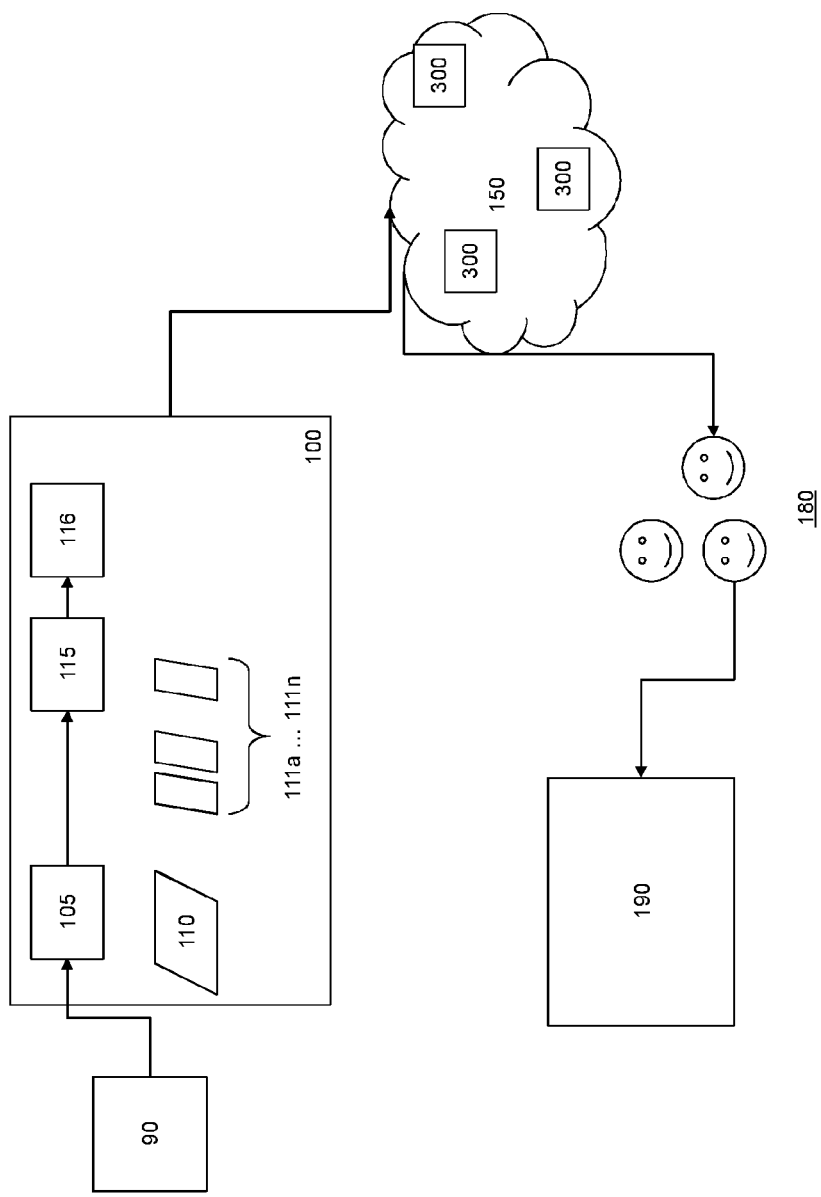
FIG. 1 schematically illustrates a content distribution architecture employing the method of the invention.

FIG. 1 schematically illustrates a content distribution architecture employing the method of the invention. The architecture generally comprises an encoder 100, a transport medium 150, recipients 180 and a detector 190.

The encoder 100 employs divider 105 to divide the content 110 into fragments 111a, . . . 111n, and transcodes each of these fragments using transcoding module 115. Transcoding generally involves translating the fragments into a format suitable for distribution over the transport medium 150 for reception and use by the intended recipients. Optionally in addition the fragments are encrypted as well, using encryption module 116.

The division into fragments depends on the characteristics of the content and the configuration of the system, and is usually done to realize the most efficient trans-coding, e.g., the fragment boundaries may be chosen at scene changes to allow for efficient video compression. The fragments may vary in duration, but usually have a fixed (approximate) maximum duration. The encoder may produce multiple instances for each fragment at different bit-rate and/or resolution to allow for a trade-off between content quality and network bandwidth requirements.

The encrypted fragments are then distributed through the transport medium 150, which preferably uses a Content Distribution Network (CDN). The interface to the recipients 180 is achieved by edge servers 300, which are located at strategic locations in the CDN. A user that wants to consume a piece of content makes a request to an edge server 300, which provides the user with a list of fragments to download and the location of these fragments. This list is often called a manifest. The particular instance of the fragments may be dynamically changed, depending on the available bandwidth.

In accordance with the invention, it is desirable to embed a watermark payload in the content 110. Various purposes for watermarking are possible. As an example, the payload here is a personalized identifier, linking the piece of content as requested by a particular user uniquely to that individual user. This way, should any unauthorized redistribution of the content take place, then this can be traced back to the user.

These user identifiers are to be managed by the edge server, where the interface with the users is realized. So, ideally, the watermarking is done by a single watermarking component integrated with the edge server. However, this may be time-consuming or expensive. If the optional encryption module 116 is employed, then this option is excluded altogether as watermarking involves adapting the content 110, which cannot be done on the encrypted fragments.

Figure 2:
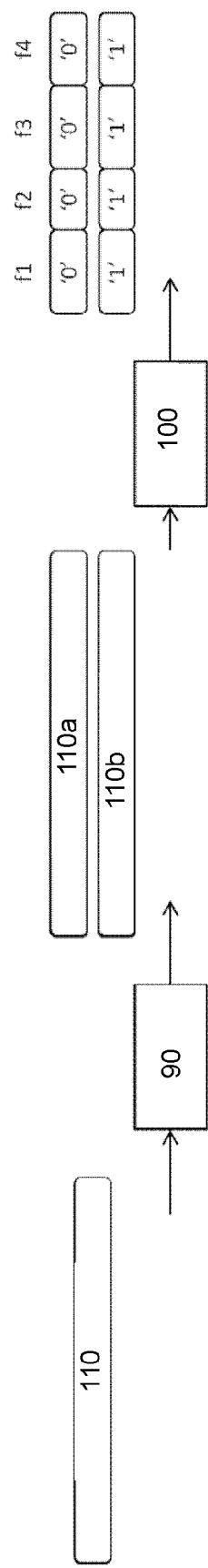
FIG. 2 schematically illustrates a solution for two-stage watermarking employing a binary alphabet.

To enable efficient high-volume watermarking, the common solution is to use a two-stage watermarking solution. The first stage is performed by a pre-processor 90, which sits before the encoder. The pre-processor 90 has the functionality to embed watermark symbols from some alphabet into the content. A common way to do this is by defining for each symbol a correspondence to a (pseudo-random) pattern and embedding the pattern in some domain (e.g., temporal, spatial, frequency, or combination thereof) by modulating some content features. Then for each symbol in the alphabet, the pre-processor 90 creates a different watermarked version of the content 110, watermarking a given payload symbol from a given alphabet in a given segment of the content 110. For example, in case of a binary alphabet, the pre-processor generates two versions: version 110a embedded with a '0' and version 110b embedded with a '1'. This is illustrated in FIG. 2. The encoder 100 subdivides these two versions in fragments f1, f2, f3, f4 having watermarked segments: one with the payload of '0' and the other with the payload of '1'. Of course other alphabets, with more or other symbols, can also be used.

Each of these different watermarked versions then follow the regular chain through the architecture. This means that the encoder 100 transcodes and encrypts them, and distributes them through the medium 150. Note that for a watermarking alphabet of size N, the amount of data to be distributed through the network is now N times as large, because there are N watermarked versions.

Figure 3:
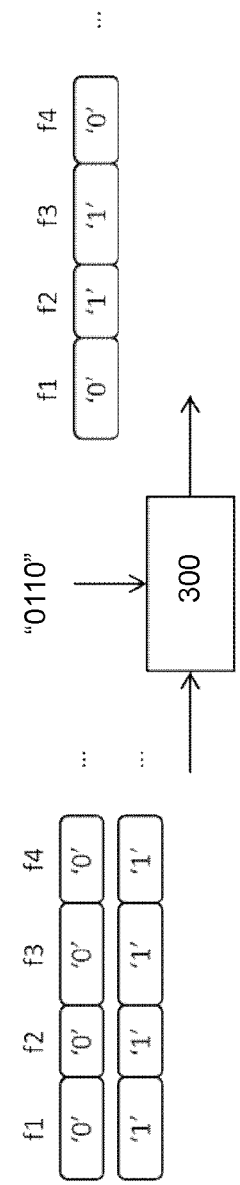
FIG. 3 schematically illustrates how various segments with mutually different payloads can be used to embed a user identifier.

FIG. 3 schematically illustrates how the various fragments with mutually different payloads can be used to embed a user identifier, as discussed above. In the embodiment illustrated, a user identifier of 0110 is to be embedded in the content. This is achieved by successively electing the version of fragment f1 with a '0' embedded, the version of fragment f2 with a '1' embedded in it, the version of fragment f3 with a '1' embedded in it and finally the version of fragment f4 with a '0' embedded in it. This combination of fragments is then distributed to this particular user over the transport medium 150.

In a preferred embodiment this step is performed in the edge servers 300. This requires applying some encoding scheme to encode the user identifier to a payload consisting of a sequence of watermark symbols. Then for each user one of the multiple versions of a fragments is chosen with different watermark symbols such that the resulting content stream contains the payload for that particular user. This fragment selection can be done efficiently on the compressed and encrypted content and is thus suitable for efficient, high-volume content watermarking. Note that the payload is embedded in the content symbol-by-symbol, one after the other in time, and that the points in the content where a switch between the different watermarked versions is possible are defined by the fragment boundaries.

Figure 4:
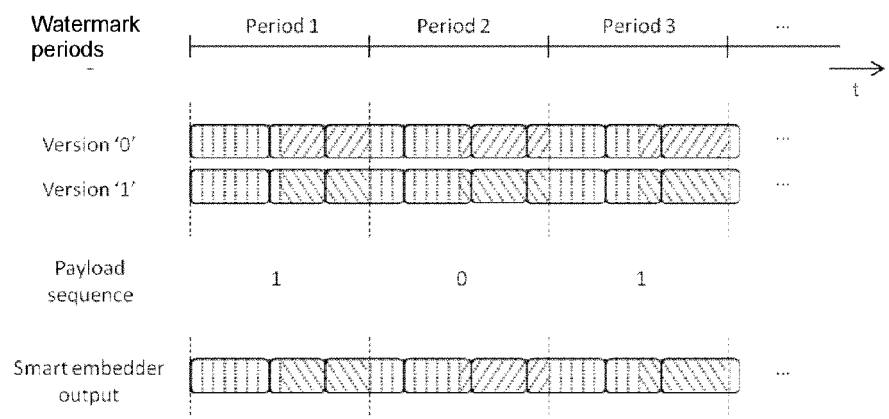
FIG. 4 schematically illustrates how a reference watermark may be embedded in accordance with the invention.

In accordance with the invention, the pre-processor 90 treats for each watermarking period a segment prior to or following a given segment wherein a watermark and payload is embedded as an intermediary segment. The length of this intermediary segment is chosen to be substantially equal to or greater than the maximum fragment length. The intermediate segment is different from the segments having a watermark and payload. In one embodiment for example, the pre-processor 90 simply refrains from watermarking anything at all in the intermediary segment. In another embodiment, the pre-processor 90 embeds a reference watermark into the intermediary segment. In the latter case, the pattern embedded in the intermediary segment should be equal for all the different watermarked versions. The pattern embedded in the given segment is generally different for the different watermarked versions and realizes the embedding of the symbol for that particular version. This is depicted in FIG. 4, where similar hashing denotes similar pattern embedding. In each watermarking period a number of fragments are shown as hatched. From FIG. 4 it is clear that for each watermarking period the two versions of the content share an intermediate segment, wherein the hashing in both streams is equal, whereas in the watermarked segment hashing is shown in diagonal lines in different directions. After selection, the content has a sequence of watermarked segments, having the alphabet symbols embedded as payload therein, which segments can be located by the detecting the intermediate segments.

Figure 5:
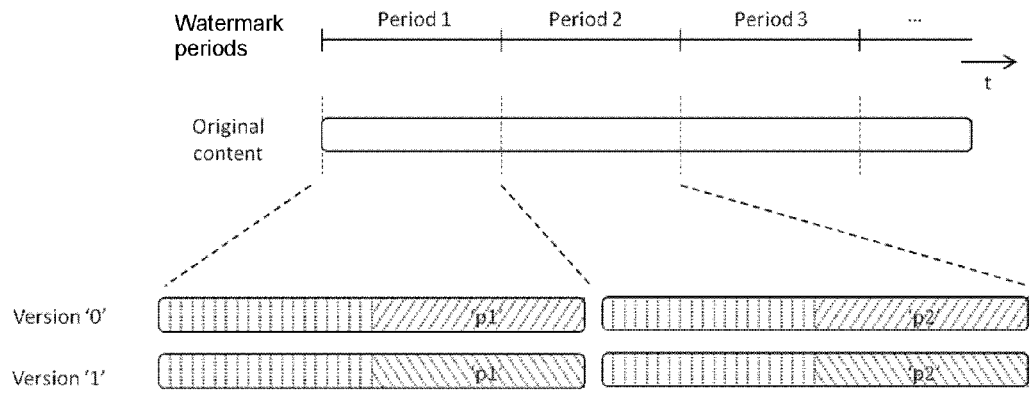
FIG. 5 schematically illustrates how a period number may be embedded into a given segment for each period.

In a further embodiment the payload may be at least partially related to its position in the content. As illustrated in FIG. 5, the pre-processor 90 may embed the period number, here given as p1 and p2, into the given segment for each period. This period number directly indicates the corresponding symbol position in the payload. The number of different watermarked versions as output by the pre-processor 90 remains the same, because the different versions only need to differentiate the payload symbol; the period number is the same for each of these versions.

Worded differently, the invention relates to a method of distributing content in plural fragments, each fragment being no longer than a given maximum fragment length. The method comprises watermarking the content, in which watermarking the content comprises watermarking a given payload symbol from a given alphabet in a given segment of the content, and inserting an intermediary segment between subsequent watermarked segments, in which the length of this intermediary segment being substantially equal to or greater than the maximum fragment length. The watermarked content is fragmented in a plurality of fragments.

At any point in time, detection of the watermark may be desirable. The detector 190 may continually monitor the transport medium 150, perform detection on the request of a recipient 180 or detect copies of the content 110 in different media, such as the Internet.

In accordance with the invention, the detector 190 is configured to detect an intermediary segment or reference part in a portion of content that has been obtained for detection. Such a portion may or may not be equal to one of the fragments $111a, \ldots, 111n$, but to ensure a good detection the portion should be at least as long as the maximum length defined during encoding for fragments.

Upon detection of the intermediary segment in the portion, the detector 190 initiates a detection of a payload symbol on a further portion of the content starting directly after the end of the intermediary segment.

In an embodiment the detector 190 is of the blind variety, that is it does not a priori know the starts and ends of the periods in the content. In this embodiment, however, it does know the duration of the watermarking periods, and the configuration of the intermediary segments which contain a reference watermark, because these are fixed and determined beforehand. Hence, the detector can search for the start of the period by applying a moving window of length equal to the segment length through the content and searching for the optimal detection of the reference watermark. Note that the step size of the moving window gives a trade-off between detection accuracy and detector efficiency. Simultaneously with each moving window trial, the detector may perform a (brute-force) scale search to compensate for any processing that the content might have undergone. The detector 190 can now easily reconstruct the start and end times of the segments.

CLOSING NOTES

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

Some or all aspects of the invention may be implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

REFERENCE NUMERALS FIGS. 4 AND 5

401 Watermark periods
402 Version '0'
403 Version '1'
404 Payload sequence
405 Smart embedder output
501 Watermark periods
502 Original content
503 Version '0'
504 Version '1'

The invention claimed is:

1. A method, implemented in an encoder, of distributing watermarked content in plural fragments, by transcoding the fragments into a format suitable for distribution over a data transport medium, each fragment being no longer than a given maximum fragment length, comprising watermarking segments of the content, each segment being part of a watermarking period, in which watermarking the content comprises:

watermarking a given payload symbol from a given alphabet in a first segment of the content in a first watermarking period;

watermarking a given payload symbol from the given alphabet in a second segment of the content in a second watermarking period following the first watermarking period, the first segment and the second segment being spaced apart by an intermediary third segment, wherein a reference watermark having a value being different from any of the payload symbols in the alphabet is embedded into the intermediary third segment; and fragmenting the watermarked content in a plurality of fragments, the intermediary third segment having a length that is substantially equal to or greater than the maximum fragment length.

2. The method of claim 1, comprising:
providing first copies of the first segment and the second segment;
providing second copies of the first segment and the second segment;
watermarking the first copies of the first segment and the second segment with a first symbol from the given alphabet; and
watermarking the second copies of the first segment and the second segment with a second symbol from the given alphabet.

3. The method of claim 1, further comprising:
providing a first copy of the intermediary third segment and a second copy of the intermediary third segment; and
watermarking the first copy of the intermediary third segment and the second copy of the intermediary third segment with a reference watermark;
wherein the reference watermark having a value being different from any of the payload symbols in the alphabet.

4. The method of claim 1, wherein a reference watermark is embedded into the intermediary third segment, the reference watermark having a payload that is at least partially related to its position in the content.

5. The method of claim 4, wherein the distributing content in plural fragments is applied repeatedly to consecutive segments of the content of consecutive watermarking periods.

6. The method of claim 4, wherein consecutive segments of the content are of equal first length and plural intermediary segments between the consecutive segments are of an equal, second length.

7. The method of claim 4, wherein the method is performed on a computer-readable non-transitory storage medium comprising executable code.

8. A system for distributing watermarked content in plural fragments, each fragment being no longer than a given maximum fragment length, comprising:
a preprocessor that watermarks segments of the content, each segment being part of a watermarking period, in which watermarking the content comprises watermarking a given payload symbol from a given alphabet in a first segment of the content in a first watermarking period, and watermarking a given payload symbol from the given alphabet in a second segment of the content in a second watermarking period following the first watermarking period; and
a divider that divides the content in to a plurality of fragments,
wherein the preprocessor watermarks the content such that the first segment and the second segment are spaced apart by an intermediary third segment, the intermediary third segment having a length that is substantially equal to or greater than the maximum fragment length, wherein a reference watermark having a value being different from any of the payload symbols in the alphabet is embedded into the intermediary third segment.

9. A method of detecting a payload symbol from a given alphabet in a portion of watermarked content distributed in plural fragments, each fragment being no longer than a given maximum fragment length, and obtained for detection, the payload symbol having been watermarked in a segment of the content, which segment is preceded or followed by a distinctive intermediary segment, the intermediary segment having a length being substantially equal to or longer than a maximum fragment length, wherein a reference watermark having a value being different from any of the payload symbols in the alphabet is embedded into the intermediary segment, the method comprising, upon detection of the intermediary segment in the portion, initiating a detection of a payload symbol of the content starting directly after an end or ending directly before a start of the intermediary segment.

10. The method of claim 9, wherein the method is performed on a computer-readable non-transitory storage medium comprising executable code.

* * * * *